United States Patent Office
3,230,437
Patented Jan. 18, 1966

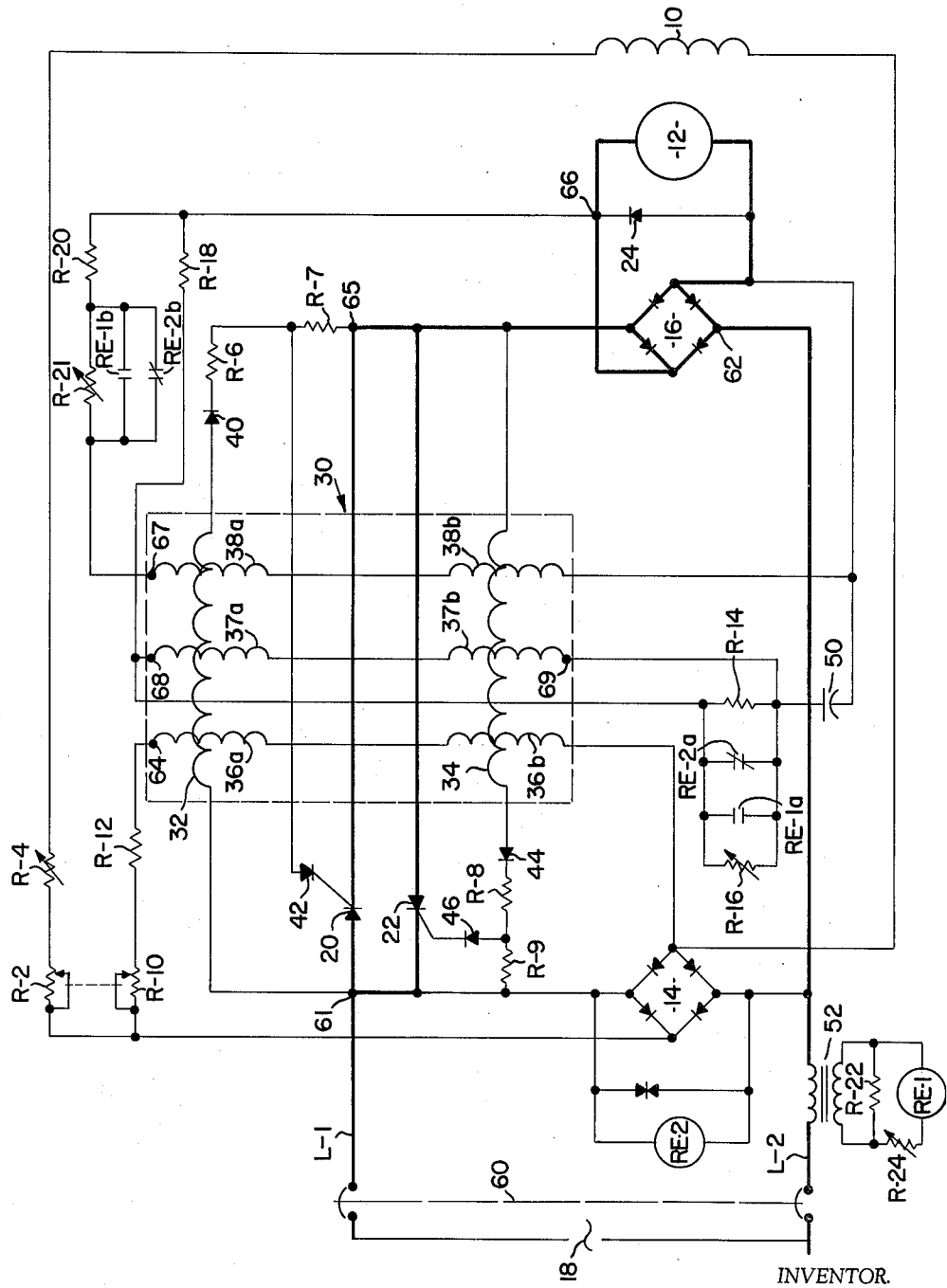

3,230,437
SPEED CONTROL CIRCUIT FOR D.C. MOTOR
Triest J. Cappello, Depew, N.Y., assignor to Hobam, Inc., Buffalo, N.Y., a corporation of New York
Filed Nov. 8, 1963, Ser. No. 322,346
8 Claims. (Cl. 318—338)

This invention relates to a full wave control circuit for connection between a source of alternating current and a direct current load for controlling the energization rate of the load, and more particularly to a circuit of this type including triggerable rectifying devices connected between the alternating current source and the direct current load, and means for controlling the times during each cycle of the source at which the rectifier devices are triggered.

One important object of the present invention is to provide a relatively simple and inexpensive electrical circuit for controlling the energization level of a direct current load device such as a D.C. motor from an A.C. source, wherein it is desired to provide energizing current for the load during each half cycle of the alternating current source.

Another object is to provide a circuit of this type including feedback means enabling the circuit to achieve relatively uniform control of a selected operating characteristic of the load, thereby, for example, to maintain the speed of a motor relatively constant despite variations in the load on it.

Another object is to provide a device of this type including a pair of triggerable half-wave rectifiers, a saturable reactor for triggering the rectifiers, and means for controlling the operation of the reactor to maximize its effectiveness under all conditions of operation.

Silicon controlled rectifier circuits have been developed in recent years and have found application in connection with the operation, for example, of a D.C. motor from an A.C. source. In such rectifier circuits various methods have been used for triggering the silicon controlled rectifiers.

An object of this invention is to provide novel means for controlling the firing times of silicon controlled rectifiers, particularly when used in connection with the operation of a D.C. motor.

The foregoing and other objects and advantages of the invention will become apparent from the following detailed description of a presently preferred embodiment thereof, taken in conjunction with the drawing, the single figure of which is a schematic circuit diagram of the presently preferred embodiment of the invention. In the figure, the main power handling portion of the circuit is shown in heavy lines, and the auxiliary and control portions in light lines.

The circuit of the invention makes use of a pair of triggerable rectifier devices, such as silicon controlled rectifiers connected in parallel with each other and in series between the alternating current source and the load to be controlled, and a saturable reactor having plural control windings for triggering the rectifier devices. The provision of plural control windings enables the achievement of a relatively high degree of compensation for load variations, excellent control over acceleration of the load, and excellent regulation.

One feature of the invention relates to the connection of one of the plural control windings of the saturable reactor so that it primarily conducts currents induced in it by the changing magnetic fields in the reactor core, thereby enhancing the degree of regulation achieved by the reactor through the triggerable rectifier devices. In the embodiment illustrated, this control winding is also connected in series with a capacitor across the load so that it is also sensitive to the ripple voltage appearing across the load. It has been found that with such connection optimum results are achieved.

The circuit shown in the drawing is arranged for controlling the speed of a direct current motor having a shunt field winding 10 and an armature 12. The field 10 is connected across the main power input leads L-1 and L-2 through a full wave rectifier 14 and in series with two variable resistors R-2 and R-4, the functions of which will be explained hereinafter. The armature 12 is connected across the output terminals of a full wave rectifier 16, the input terminals of which are connected across the main input leads L-1 and L-2 and thereby connected to any convenient source 18 of single phase alternating current. A pair of silicon controlled rectifiers 20 and 22 are connected in parallel with each other and in series with the full wave rectifier 16 between one of the input terminals of the rectifier 16 and one of the leads L-1 and L-2 for controlling the flow of energizing current to the rectifier. The silicon controlled rectifiers 20 and 22 are oriented in opposite directions respectively for conducting on alternate cycles of the source 18. A diode 24 is connected directly across the armature 12 biased in its back direction for conventional protective purposes.

A saturable reactor 30 having two main, or gate windings 32 and 34, respectively, and three split control windings 36a and 36b, 37a and 37b, and 38a and 38b is connected for controlling the firing times of the silicon controlled rectifiers 20 and 22 on each cycle of the source 18, thereby to regulate the energization rate of the armature 12.

The first main winding 32 of the reactor is connected between the anode and the cathode of the first silicon controlled rectifier 20 in series with an auxiliary diode rectifier 40 and two resistors R-6 and R-7. The trigger terminal (not separately designated) of the silicon controlled rectifier 20 is connected through a second diode 42 to the common terminal between the two resistors R-6 and R-7. Similarly, the second main winding 34 of the reactor is connected between the cathode and anode of the second silicon controlled rectifier 22 in series with a diode 44 and two resistors R-8 and R-9, and the trigger terminal of the second silicon controlled rectifier 22 is connected through an auxiliary diode 46 to the common terminal between the two resistors R-8 and R-9.

The first control windings 36a and 36b may be called the variable control windings and are connected across the output of the full wave rectifier 14 in series with a variable speed control resistor R-10 and a fixed limiting resistor 4-12. The voltage output of the full wave rectifier 14 is substantially constant, and the current through the first control windings 36a and 36b, therefore, varies primarily in response to variations in the setting of the variable resistor R-10. Variations in the current in the first control windings 36a and 36b affect the firing times of the two main windings 32 and 34 in accordance with known principles, thereby to vary the energization rate of the armature 12. These first control windings 36a and 36b do not significantly enter into the regulating, or compensating function of the circuit, in that currents through them are not responsive to variations in the load conditions, but are primarily responsive only to the setting of the variable resistor R-10.

The functioning of the second control windings 37a and 37b is not clearly understood, but when it is connected as shown, it optimizes the performance of the circuit and improves the speed of response and the gain of the reactor and its associated circuitry. The second control windings 37a and 37b are designed primarily to conduct currents induced in them by changing magnetic fields within the reactor core, and, through operation of a current responsive relay RE-1, their effect is automatically varied in accordance with the demands of the load.

A fixed resistor R-14 and a variable resistor R-16 are connected in parallel with each other directly across the second control windings 37a and 37b for limiting the induced currents flowing in the windings. During periods of relatively heavy current drain into the armature 12, the resistors R-14 and R-16 are shorted out by the normally open relay contact RE-1a as hereinafter described, thereby permitting maximum current flow in the second control windings 37a and 37b. It is also desired to permit maximum current flow immediately after the circuit is disconnected from the main power lines L-1 and L-2, and for this purpose the resistors R-14 and R-16 are also shorted out by the normally closed relay contact RE-2a during times when the circuit is disconnected from the power source 18.

The second control windings 37a and 37b are also connected through a capacitor 50 and a limiting resistor R-18 across the armature 12 so that it is also sensitive to the ripple voltage appearing across the armature as well as to the induced voltage resulting from currents in the other windings of the reactor.

The third control windings 38a and 38b are the feedback windings and are connected across the armature 12 in series with a relatively low value fixed resistor R-20 and a variable resistor R-21. They are arranged for negative feedback, that is, in response to an increase in the voltage across the armature 12, the resulting increase in current through the control windings 38a and 38b will tend to cause the main windings 32 and 34 of the reactor to fire later in the cycle, thereby reducing the voltage across the armature. A normally open contact RE-1b, and a normally closed relay contact RE-2b are both connected in parallel with the variable resistor R-21 for affecting the response of currents in the third control windings 38a and 38b during start-up and at other times of relatively heavy current drain by the armature 12, and when the circuit is disconnected from the main power source 18.

The relay contacts RE-1a and RE-1b are actuated by the coil RE-1 which is connected to the output of a transformer 52, the primary winding of which is connected in series in one of the lines L-1 and L-2 leading from the main power source 18 so that all of the current consumed by the circuit and the load passes through it. A fixed resistor R-22 is connected directly across the secondary of the transformer 52, and a variable resistor R-24 is connected in series with the coil RE-1 of the relay. The values of the resistors R-22 and R-24 are selected and adjusted so that during normal operation of the motor under normal load conditions, the relay RE-1 is not actuated, but when the motor is under acceleration, or under relatively heavy load such that its current drain exceeds a specified selected value, the relay RE-1 picks up, thereby closing its contacts RE-1a and RE-1b.

The second relay RE-2 is connected directly across the output of the full wave rectifier 14 to which the field 10 is connected, and is continuously energized so long as the circuit is connected to the main power source 18. Its contacts RE-2a and RE-2b are, therefore, held open at all times that the circuit is energized, and are closed only when the circuit becomes deenergized.

The provision of the variable resistor R-2 in series with the field 10 of the motor is optional. It provides control of the energization rate of the field 10 synchronously with the control of current through the first control winding 36a and 36b. Satisfactory control may be achieved in most instances without providing this variable resistor R-2.

In operation, the overload sensitive relay RE-1, and the induced current control windings 37a and 37b function to reduce excessive energization of the armature 12. The induced current windings 37a and 37b act to retard the response of the reactor 30 to changes in the voltage across the armature, thereby reducing the tendency of the circuit to overload the armature during acceleration, to provide insufficient current during deceleration, and to hunt.

The effect of the windings 37a and 37b is accentuated during times such as start-up when the armature 12 is apt to require relatively large currents. Under such situations, the relay RE-1 becomes energized, closing its contact RE-1a, and thereby forming a direct, low resistance connection between the opposite ends of the windings 37a and 37b to permit maximum current to flow in the windings. The relay RE-1 remains energized only so long as the overload current continues to flow. Normally, during start-up, during acceleration, and during times when the motor is subjected to sudden increases in load, the relay RE-1 chatters, that is, it becomes repetitively alternately energized and deenergized at a fairly rapid rate, because very shortly after it picks up, the current drain is substantially reduced even though there is no significant change in the load condition.

Operation of the relay RE-1 also affects the feedback control windings 38a and 38b, providing increased feedback voltage by shorting out the resistor R-21 whenever the relay RE-1 becomes energized. This action adds to and reinforces the action of the induced current windings 37a and 37b to retard the reaction of the reactor, thereby to prevent excessive current flow in the armature 12 to reduce hunting and to permit the motor to accelerate smoothly to the desired speed as set by the control resistor R-10 without over-shooting.

The two normally closed contacts RE-2a and RE-2b of the second relay RE-2 are connected, respectively, across the second control windings 37a and 37b and the feedback control variable resistor R-21 to permit maximum current flow in the windings 37a and 37b, and 38a and 38b in response to the back E.M.F. of the armature 12 immediately after the circuit is disconnected from the main power source 18. This assures that the reactor core is completely desaturated in preparation for the next time the circuit is energized, so that even on the first cycle of the energizing current, the circuit will not supply excessive current to the armature.

The operation of the circuit will be understood from the preceding description, but may be briefly summed up here:

In operation as a control for the speed of a D.C. shunt-wound motor, A.C. power of say 230 volts, single phase is applied, when the circuit breaker 60 is closed. The impressed voltage appears at points 61 and 62 of the circuit as sinusoidal A.C. and at full line value.

Let us assume that the sine wave voltage at point 61 is swinging positive with respect to point 62, and that enough current is flowing through R-10 and the reactor windings 36a and 36b with plus on the terminal 64 so that the reactor 30 is completely turned off. Current flowing through windings 36a and 36b control the point at which the gate windings 32 and 34 fire, as already described. Windings 36a and 36b are connected in such way that with an increase of current with plus on terminal 64, gate windings 32 and 34 are turned off.

As the current in windings 36a and 36b decreases toward zero, gate windings 32 and 34 begin to fire earlier in their respective cycles. Their firing pulses with steep wave fronts, trigger the silicon controlled rectifiers 20 and 22, and control their conduction angles.

When the input voltage of point 61 is swinging positive, as assumed, silicon controlled rectifier 20 will want to conduct in the forward direction (silicon controlled rectifier 22 is in the blocking state). The point at which conduction begins is determined by the value of the voltage and current in reactor gate winding 32 and gate 42. This value of voltage and current is determined by potentiometer R-10 and resistances R-6 and R-7. R-7 acts as a shunt between the gate and cathode of rectifier 20, allowing a small amount of magnetizing current to flow without triggering the silicon controlled rectifiers.

When the input voltage at point 61 swings negative with respect to point 62, silicon controlled rectifier 22 will want to conduct; and the point at which conduction begins is determined by the value of voltage and current in its respective reactor gate winding 34 and the gate 46 of this rectifier 22. This value of voltage and current is determined by potentiometer R-10, and resistances R-9 and R-8. R-8 acts as a shunt between the gate and the cathode of rectifier 22.

The controlled A.C. output of the silicon controlled rectifiers at points 65 and 62 is applied to silicon rectifier bridge 16, which, in turn, applies controlled D.C. voltage to the armature 12.

Speed regulation control windings 37a, 37b and 38a, 38b of reactor 30 and resistors R-21 and R-20 and R-18 and R-14 make up the controlled speed regulation circuit. These windings act to maintain the D.C. voltage output from bridge 16 fairly constant irrespective of load. Potentiometer R-16 controls the gain.

The plus D.C. voltage at point 66 allows current to flow through reactor windings 38a, 38b in such direction with plus on terminal 67 so as to turn reactor 30 in an off direction. If the voltage at 66 tends to increase, reactor 30 tends to decrease its firing angle, therefore decreasing the output of the silicon controlled rectifiers. If the voltage tends to decrease, less current flows through windings 38a, 38b, reactor 30 will fire earlier in the cycle, triggering the silicon controlled rectifiers earlier; and this will tend to keep the output voltage and speed at a constant value.

Control windings 37a, 37b contain an induced A.C. voltage which may be cancelled out by shorting these windings between terminals 68 and 69. When these windings are connected as shown, the induced A.C. voltage becomes controllable, and becomes a function of the load. It also affects the speed of response or gain of the reactor and the associated circuitry.

When the load on the motor increases and the voltage at point 65 or 66 tends to decrease, the A.C. voltage in windings 37a, 37b becomes greater. This rise in A.C. voltage tends to change or increase the degree of saturation of the reactor 30. Reactor 30 in turn fires earlier in its cycle and tends to maintain the output voltage of rectifiers 20 and 22 constant despite load fluctuations.

Relay contact RE-1a shorts out windings 37a, 37b of reactor 30 during the current limiting action of relay RE-1. When the current limit circuit is functioning during fast acceleration or overload, shorting out windings 37a, 37b aid in controlling the acceleration time and peak overload surges. Relay contact RE-2a shorts out these windings when the controller is turned off; and it is also shorted at start-up.

Transformer 52, with its primary winding carrying the load current, senses changes in the load. Relay RE-1 connected across the secondary of the transformer can be set by adjusting resistor R-24 to energize at various load settings. When the current in the primary winding reaches the desired overload settings, the relay coil energizes. Contact RE-1b shorts out the greater part of the resistance developed by resistors R-21 and R-20. With only a small value of resistance remaining in that part of the circuit, the feedback current rises to a high value. Reactor 30 turns off to a very low value, triggering the silicon controlled rectifiers at a value of twenty volts or less, depending upon the value of the resistance that remains in the circuit. Relay RE-1 will energize and deenergize repeatedly until the load current returns to the desired value.

Slow acceleration is achieved by resetting the reactor 30 to a point beyond cut-off at the instant the controller is turned off. The counter E.M.F. of the motor sends current through the feedback winding through closed relay contact RE-2b and a small value of resistance of resistor R-20. When the controller is turned on for the next operating cycle reactor 30 builds up to its maximum setting slowly as determined by rheostat R-10.

The circuit achieves excellent regulation and has a smooth anti-hunt characteristic, both during acceleration and during steady drive of the motor. It has the advantage also of including only standard, commercially available components, thereby enabling its production at relatively low cost.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A control circuit for controlling the energization level of a D.C. load such an electric motor comprising
   (a) a full-wave rectifier,
   (b) means for connecting a load across the output terminal of said rectifier,
   (c) a pair of triggerable rectifier devices,
   (d) means connecting said devices, oriented in mutually opposite respective directions, in parallel with each other and in series with the input terminals of said rectifier across a source of alternating current,
   (e) a saturable reactor having two separate main windings and plural control windings, means connecting said main windings in parallel with each other and with said triggerable rectifier devices,
   (f) means connecting one terminal of each of said main windings to the trigger terminal of a different respective one of said triggerable devices, and
   (g) circuit means connected directly across one of said control windings for allowing current to flow therein induced by the changing magnetic flux in the core of said reactor, said last-named circuit means including
   (h) means for limiting the flow of current in said one control winding while the current drain in the load is relatively light, and
   (i) means for disabling said limiting means while the curent drain is relatively heavy.

2. A control circuit for controlling the energization level of a D.C. load such as an electric motor comprising
   (a) a full-wave rectifier,
   (b) means for connecting a load across the output terminal of said rectifier,
   (c) a pair of triggerable rectifier devices,
   (d) means connecting said devices, oriented in mutually opposite respective directions, in parallel with each other and in series with the input terminals of said rectifier across a source of alternating current,
   (e) a saturable reactor having two separate main windings and plural control windings,
   (f) means connecting said main windings in parallel with each other and with said triggerable rectifier devices,
   (g) means connecting one terminal of each of said main windings to the trigger terminal of a different respective one of said triggerable devices,
   (h) circuit means connected directly across one of said control windings for allowing current to flow therein induced by the changing magnetic flux in the core, and
   (i) means connecting said one control winding in series with a capacitor across the load so that it also conducts current in response to the ripple voltage across the load.

3. A control circuit for controlling the energization level of a D.C. load such as an electric motor, comprising
(a) a full-wave rectifier,
(b) means for connecting a load across the output terminal of said rectifier,
(c) a pair of triggerable rectifier devices,
(d) means connecting said devices, oriented in mutually opposite respective directions, in parallel with each other and in series with the input terminals of said rectifier across a source of alternating current,
(e) a saturable reactor having two separate main windings and plural control windings,
(f) means connecting said main windings in parallel with each other and with said triggerable rectifier devices,
(g) means connecting one terminal of each of said main windings to the trigger terminal of a different respective one of said triggerable devices,
(h) circuit means connected directly across one of said control windings for allowing current to flow therein induced by the alternating current flowing in said main windings,
(i) circuit means connecting a second one of said control windings across the load for inverse feedback,
(j) means for restricting the current flow in said one and in said second control windings while the current drain in the load is relatively light, and
(k) means for disabling said restricting means while the current drain is relatively heavy.

4. A control circuit for controlling the energization level of a D.C. load such as an electric motor comprising
(a) a full-wave rectifier,
(b) means for connecting a load across the output terminal of said rectifier,
(c) a pair of triggerable rectifier devices,
(d) means connecting said devices, oriented in mutually opposite respective directions, in parallel with each other and in series with the input terminals of said rectifier across a source of alternating current,
(e) a saturable reactor having two separate main windings and plural control windings, means connecting said main windings in parallel with each other and with said triggerable rectifier devices,
(f) means connecting one terminal of each of said main windings to the trigger terminal of a different respective one of said triggerable devices, and
(g) circuit means connected directly across one of said control windings for allowing current to flow therein induced by the changing magnetic flux in the core of said reactor, said last-named circuit means including
(h) means for limiting the flow of current in said one control winding while the current drain in the load is relatively light, and
(i) means for disabling said limiting means while the current drain is relatively heavy and also immediately upon disconnection of the control circuit from the alternating current source.

5. A control circuit for controlling the energization level of a D.C. load such as an electric motor comprising
(a) a full-wave rectifier,
(b) means for connecting a load across the output terminal of said rectifier,
(c) a pair of triggerable rectifier devices,
(d) means connecting said devices, oriented in mutually opposite respective directions, in parallel with each other and in series with the input terminals of said rectifier across a source of alternating current,
(e) a saturable reactor having two separate main windings and plural control windings, means connecting said main windings in parallel with each other and with said triggerable rectifier devices,
(f) means connecting one terminal of each of said main windings to the trigger terminal of a different respective one of said triggerable devices, and
(g) circuit means connected directly across one of said control windings for allowing current to flow therein induced by the changing magnetic flux in the core of said reactor, said last-named circuit means including
(h) means for limiting the flow of current in said one control winding while the current drain in the load is relatively light, and
(i) means for disabling said limiting means while the current drain is relatively heavy, said disabling means including
(j) a transformer having its primary connected in series between one terminal of the source and one terminal of said full-wave rectifier, and
(k) a relay having its energizing coil connected across the secondary of said transformer,
(l) the contacts of said relay being connected across said limiting means for shorting it when said relay picks up.

6. A control circuit for controlling the energization level of a D.C. load such as an electric motor, comprising
(a) a full-wave rectifier,
(b) means for connecting a load across the output terminal of said rectifier,
(c) a pair of triggerable rectifier devices,
(d) means connecting said devices, oriented in mutually opposite respective directions, in parallel with each other and in series with the input terminals of said rectifier across a source of alternating current,
(e) a saturable reactor having two separate main windings and plural control windings,
(f) means connecting said main windings in parallel with each other and with said triggerable rectifier devices,
(g) means connecting one terminal of each of said main windings to the trigger terminal of a different respective one of said triggerable devices,
(h) circuit means connected directly across one of said control windings for allowing current to flow therein induced by the alternating current flowing in said main windings,
(i) circuit means connecting a second one of said control windings across the load for inverse feedback,
(j) means for restricting the current flow in said one and in said second control windings while the current drain in the load is relatively light, and
(k) means for disabling said restricting means while the current drain is relatively heavy, said disabling means including
(l) a transformer having its primary connected in series between one terminal of the source and one terminal of said full-wave rectifier, and
(m) a relay having its energizing coil connected across the secondary of said transformer,
(n) the contacts of said relay being connected across said restricting means for shorting it when said relay picks up.

7. A control circuit for controlling the energization level of a D.C. load such as an electric motor comprising
(a) a full-wave rectifier,
(b) means for connecting a load across the output terminal of said rectifier,
(c) a pair of triggerable rectifier devices,
(d) means connecting said devices, oriented in mutually opposite respective directions, in parallel with each other and in series with the input terminals of said rectifier across a source of alternating current,
(e) a saturable reactor having two separate main windings and three control windings,
(f) means connecting said main windings in parallel with each other and with said triggerable rectifier devices,
(g) means connecting one terminal of each of said main windings to the trigger terminal of a different respective one of said triggerable devices,
(h) circuit means connected across a first one of said control windings for applying a controllably variable D.C. voltage to it,
(i) circuit means connected directly across a second one of said control windings for allowing current to flow therein induced by the changing magnetic flux in the core of said reactor,
(j) means connecting the third control winding across the load for inverse feedback regulation,
(k) resistors connected in series respectively with said second and said third control windings for restricting current flow through them,
(l) a relay having two normally open contacts,
(m) said contacts being connected respectively across said resistors for shorting them out when said relay picks up, and
(n) circuit means for actuating said relay in response to an increase in the load current to a predetermined value.

8. A control circuit for maintaining the speed of a D.C. motor approximately constant, comprising
(a) a pair of triggerable rectifier devices connected in parallel with each other and in series between an alternating current source and the motor,
(b) a reactor having plural control windings for triggering the rectifier devices, one of the control windings being connected to conduct primarily currents induced in it by the changing magnetic fields in the reactor,
(c) a capacitor,
(d) one control winding being connected in series with said capacitor and across the motor,
(e) two full wave rectifiers, which are oriented in opposite directions,
(f) the motor having a shunt field winding and an armature, and
(g) the field winding being connected through one of said full wave rectifiers with the A.C. source and in series with two variable resistors, and
(h) the armature being connected across the output terminals of the other full wave rectifier,
(i) the input terminals of said other full wave rectifier being connected to said A.C. source, and
(j) said other full wave rectifier being connected in series with said triggerable rectifier devices and the A.C. source,
(k) a transformer connected in series with the A.C. source,
(l) a relay connected to the secondary of the transformer,
(m) a fixed resistor connected across the secondary of the transformer, and
(n) a variable resistor connected in series with the coil of the relay.

References Cited by the Examiner
UNITED STATES PATENTS
3,181,050   4/1965   Berman _____ 318—331

ORIS L. RADER, *Primary Examiner.*

S. GORDON, *Assistant Examiner.*